United States Patent [19]
Pahl et al.

[11] 3,954,926
[45] May 4, 1976

[54] METHOD OF MOLDING A COMPOSITE REINFORCED FOAMED PRODUCT

[76] Inventors: Fritz Wilhelm Pahl, Thuillestr. 31, 8000 Munich 60; Jobst Harreis, Mathunistr. 17, 8000 Munich 21, both of Germany

[22] Filed: June 5, 1972

(Under Rule 47)

[21] Appl. No.: 259,400

[30] Foreign Application Priority Data
June 3, 1971 Germany............................ 2127582

[52] U.S. Cl............................. 264/46.4; 264/46.7;
264/54; 264/271; 264/328; 264/DIG. 83;
425/4 R; 428/260; 428/315; 428/320;
428/425
[51] Int. Cl.²....................... B29D 27/00; B29F 1/10
[58] Field of Search .......... 264/45, 46, 54, DIG. 83,
264/263, 271, 275, 328; 425/4 R; 428/260,
315, 320, 425

[56] References Cited
UNITED STATES PATENTS

| | | | |
|---|---|---|---|
| 2,845,997 | 8/1958 | Waite................... | 264/46 X |
| 2,927,876 | 3/1960 | Hoppe et al. ............ | 264/46 X |
| 3,013,922 | 12/1961 | Fisher................... | 264/45 |
| 3,055,231 | 9/1962 | Daniel................... | 264/45 UX |
| 3,087,201 | 4/1963 | Williams et al........... | 264/275 X |
| 3,161,436 | 12/1964 | Hood.................... | 264/46 X |
| 3,264,382 | 8/1966 | Angell et al. ........... | 264/46 |
| 3,273,327 | 9/1966 | Hoffman................. | 264/271 X |
| 3,303,617 | 2/1967 | Hessburg et al. ......... | 264/46 X |
| 3,341,640 | 9/1967 | Rosencrantz............. | 264/46 |
| 3,393,259 | 7/1968 | Trogdon................. | 264/46 |
| 3,480,704 | 11/1969 | Ludwig.................. | 264/45 |
| 3,599,290 | 8/1971 | Garner.................. | 264/DIG. 83 |
| 3,694,529 | 9/1972 | Josephsen et al........... | 264/DIG. 83 |
| 3,751,534 | 8/1973 | Oxley................... | 264/45 |
| 3,767,742 | 10/1973 | Robin................... | 264/328 X |
| 3,793,410 | 2/1974 | Garner.................. | 264/45 |
| 3,793,415 | 2/1974 | Smith................... | 264/45 |
| 3,809,733 | 5/1974 | Sandiford et al. ......... | 264/328 X |
| 3,825,637 | 7/1974 | Robin................... | 264/328 X |

OTHER PUBLICATIONS

Mobay Chemical Co. Bulletin. "The Rolling Showcase for Engineering Plastics." Pittsburgh, Pa., 1968, pp. 1–8.

Primary Examiner—Philip Anderson
Attorney, Agent, or Firm—Karl F. Ross; Herbert Dubno

[57] ABSTRACT

Synthetic-resin bodies, preferably composed of hardenable synthetic resins and especially thermosetting resins are formed by introducing a foamable resin into a mold cavity, setting the foamable resin upon permitting the same to expand to fill the mold cavity, and thereafter introducing into the mold cavity, without changing the volume thereof, at least one additional synthetic resin while the foamed body is plastically deformable but possesses sufficient rupture strength to prevent penetration. The resulting body thus has a surface layer of the second material which displaces the foamed first material.

3 Claims, 8 Drawing Figures

FIG.1
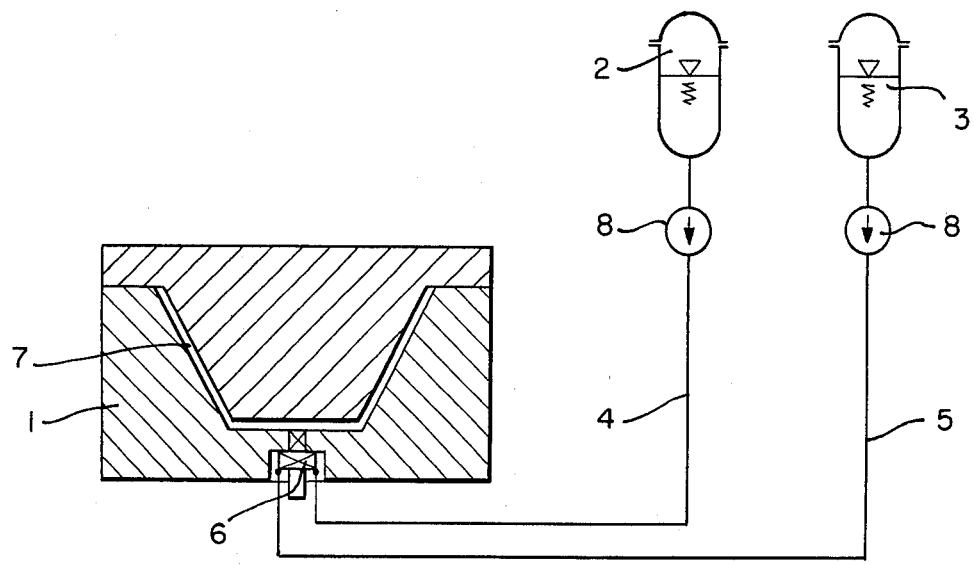
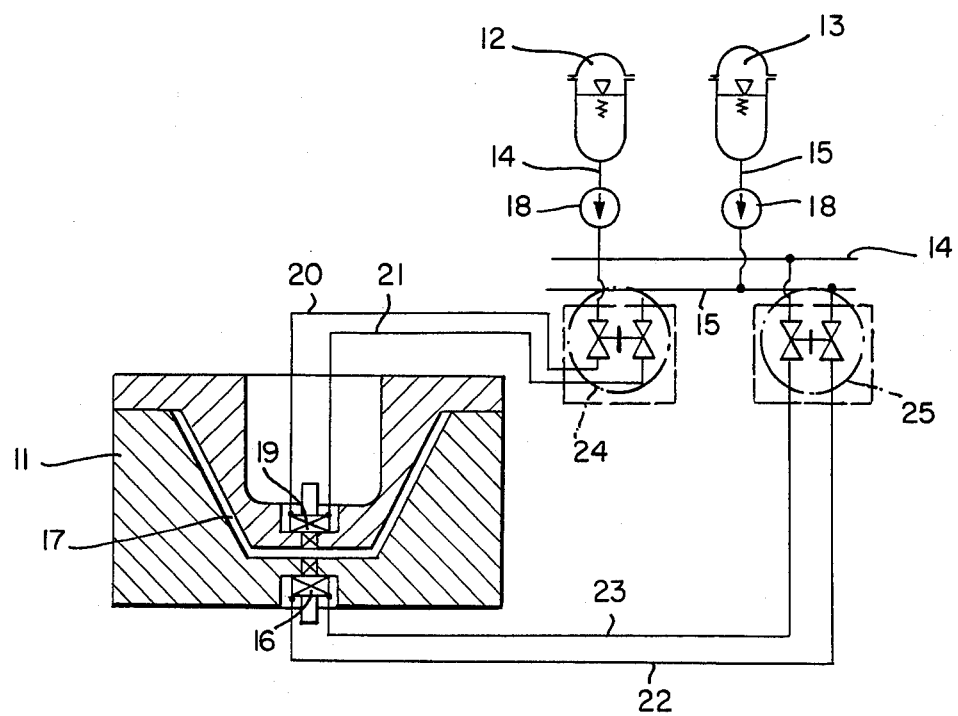
FIG.2

FIG.3
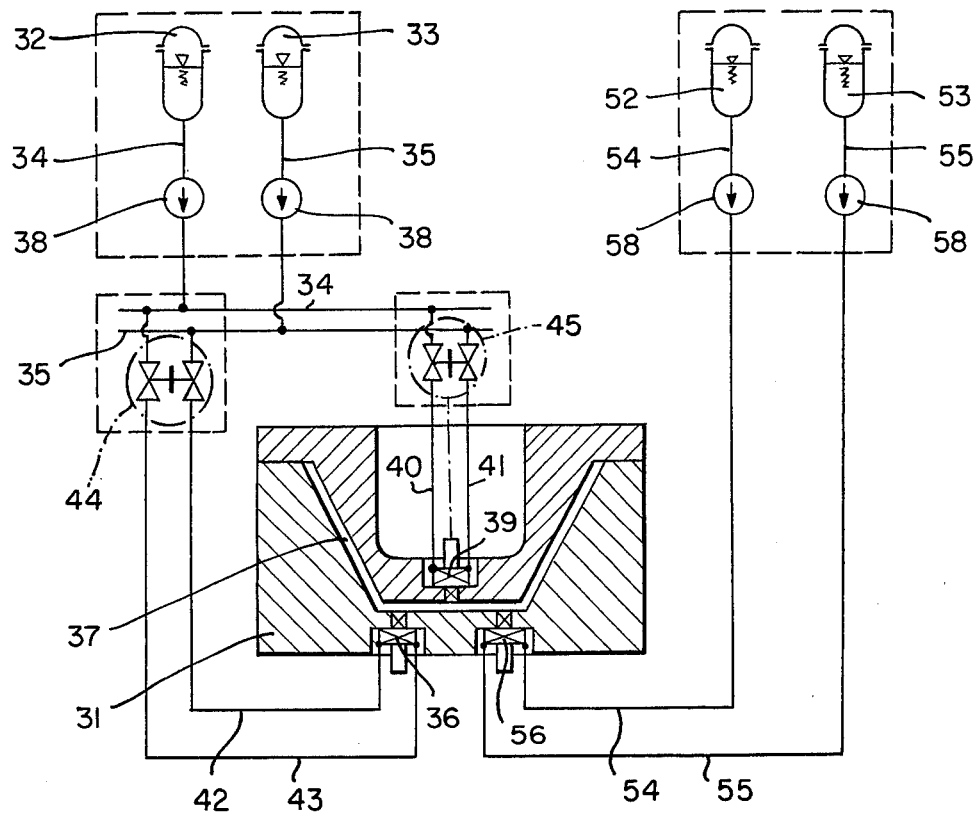
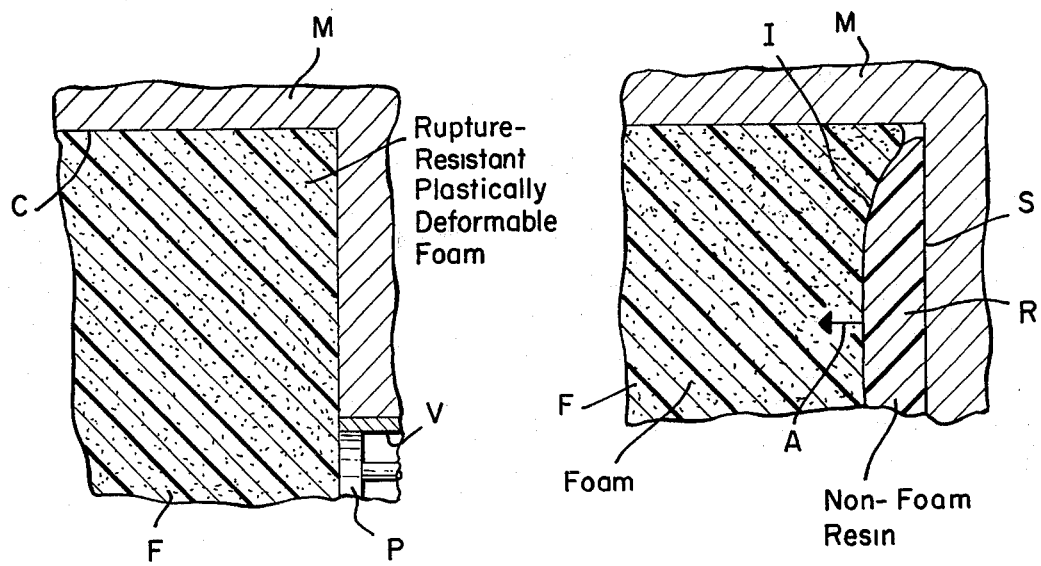
FIG.4A               FIG.4B

FIG.5A
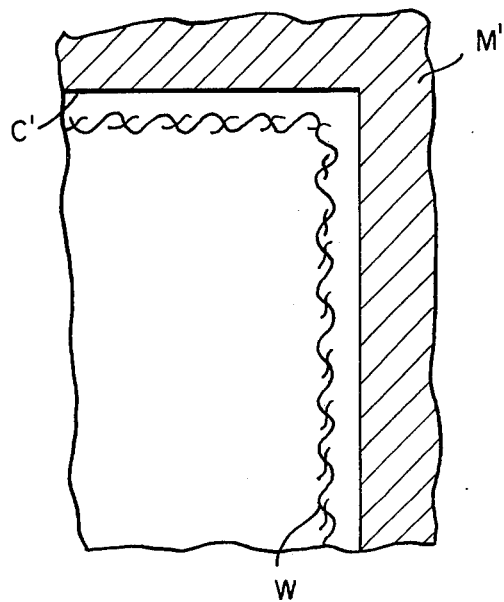
FIG.5B
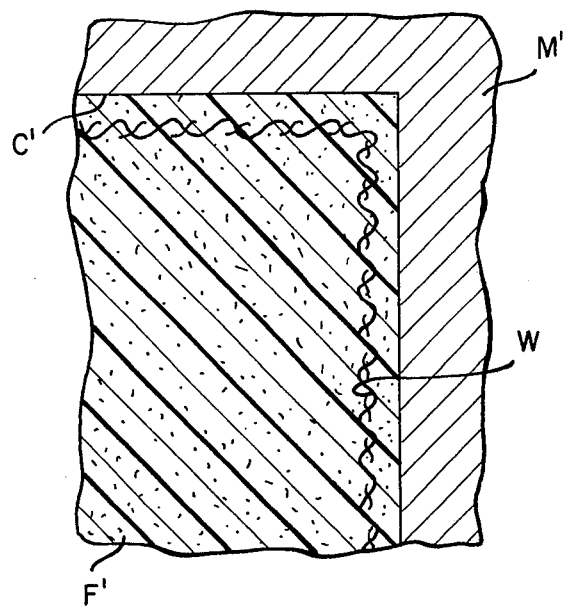
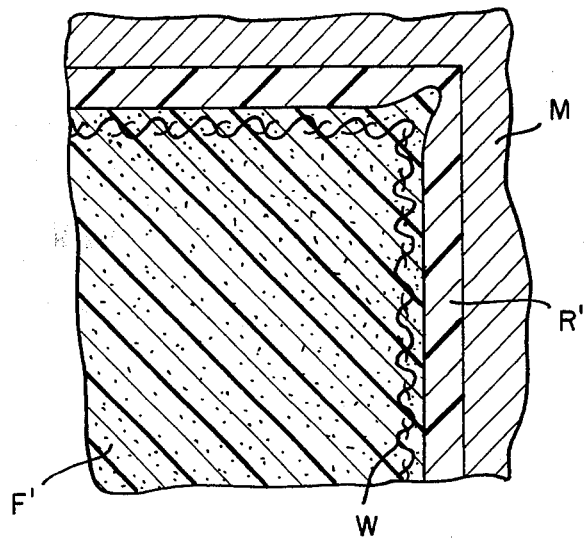
FIG.5C

METHOD OF MOLDING A COMPOSITE REINFORCED FOAMED PRODUCT

1. FIELD OF THE INVENTION

Our present invention relates to a method of producing synthetic resin bodies and, more particularly, to a method of producing composite bodies of two or more synthetic resins in a mold cavity.

2. BACKGROUND OF THE INVENTION

Common methods of forming synthetic resin bodies from hardenable materials may make use of liquid or flowable streams of synthetic resins which harden within a mold cavity and are introduced by injection under pressure or are simply cast into the mold. Various procedures have been proposed for the different types of resin which are available and, for the purposes of this application, we designate as "hardenable" resin any of the synthetic resins commercially in use which have a fluid state upon introduction into the mold cavity and can be cooled or permitted to set or cure to provide a somewhat more rigid state even though the latter condition may not make the body fully stiff or rigid. This resin may include thermoplastics which can be plasticized or masticated and/or heated with or without application of pressure, to produce the liquid state and which harden or set upon cooling. The designation also includes thermosetting materials or duromers which harden in the presence of heat by chemical reaction and even such settable compositions which can cure at low temperatures to form a more or less rigid body. We also use the term "foamable" herein to describe synthetic resins which may expand within a mold cavity to produce a cellular, porous or reticulate structure by evolution of gases either as the liquid resin expands into the free space of the mold cavity or by gases which are produced by chemical reaction or vaporization. Foamable synthetic resins may be considered as having set or become rigid when they cease to expand and resist deformation although they may remain somewhat elastic or resilient.

In prior-art systems for molding synthetic resins of the above type and especially so-called structure foams, various techniques have been used. In one such system, the prepolymerized synthetic resin material, containing a foaming agent, is introduced into a mold cavity and permitted to expand. In other systems a foamable fluid resin is similarly introduced into the mold cavity and can expand or set therein. Frequently the synthetic resin bodies produced in molds of this type have a thin but dense skin or surface film where the synthetic resin material contacts the walls of the mold cavity. The result is a sandwich structure in which a relatively low-density core of the synthetic resin material is flanked between relatively dense but thin skins of the same material.

It is also known to provide a sandwich-type structures of synthetic resin material by expanding-mold systems in which the outer layers are formed in the mold cavity and the foamable material is injected between the nonfoaming dense or surface layer to spread the latter apart in the manner of the walls of a balloon. In yet another expanding-mold arrangement, the foamable material is injected or otherwise introduced into a mold cavity, is expanded to fill the latter and permitted to set, and the mold cavity is then enlarged to accommodate the second material. The latter then fills the space between the retreating-mold wall and the surface of the foamed body originally formed thereagainst. Such systems are employed whenever the characteristics of two or more synthetic resin materials are desired. Thus where the surface textures or physical properties of one synthetic resin and the core properties of foamable resin are designed, recourse may be had to these techniques. The techniques are also employed where different color effects are desired, one resin having one color while the other resin has another. All of these systems have, however, the disadvantage that the expanding mold requires complicated equipment and control devices and production of bodies in such mold cannot be readily carried out in an automatic or serial manner. Furthermore, the surface characteristics of the bodies are not always satisfactory. Finally, these systems have the disadvantage that the previously introduced synthetic resin material must fully set before the mold is expanded if the processes are to be reproduceable and the body must have a particular configuration and characteristic. This increases the production time per unit, in any case, to a prohibitive extent.

3. OBJECTS OF THE INVENTION

It is the principal object of the present invention to provide an improved method of making synthetic resin articles, especially composite synthetic resin bodies, whereby the aforementioned disadvantages are obviated.

Yet another object of the invention is to provide a method of producing a synthetic resin body which is capable of automation is able to produce bodies at a low capital and unit cost, produces synthetic resin bodies of satisfactory surface texture and structural properties, and generally avoids the drawbacks of expandable mold systems.

Still another object of the invention is to provide a low-cost method of producing composite synthetic resin bodies having at least one foamed portion, whereby existing nonexpandable molds may be employed although two or more synthetic resin materials constitute the composite.

4. SUMMARY OF THE INVENTION

These objects and the others which will become apparent hereinafter are attained, in accordance with the present invention, with a system for producing composite synthetic resin bodies in which a first, preferably foamable synthetic resin in a fluid state is introduced into a mold cavity and is permitted to set therein while expanding in the mold cavity to form a porous, cellular or reticulate structure. According to an essential feature of the invention, a second foamable or nonfoamable synthetic resin is introduced into the mold cavity, without altering the volume thereof, between a wall of the mold and the cellular structure after the latter has set sufficiently to acquire a rupture strength resisting penetration but nevertheless sufficiently plastically deformable to allow displacement of the structure away from the wall of the mold by the second fluid material. The latter thus produces a surface layer upon the cellular structure and between the latter and the mold cavity, the surface layer bonding to the cellular structure upon setting or hardening of the contents of the mold.

The system thus has numerous advantages over the prior-art arrangement. Firstly, the system completely eliminates the drawbacks of expandable molds and is more susceptible to automation than conventional techniques for making composite bodies. Secondly, a wider range of synthetic resin materials may be used allowing the specific physical and chemical properties of these materials to be combined in the synthetic resin body. Thirdly, the unit production time for composite bodies is reduced and the reduced time enables more highly active synthetic resin compositions to be used. It is thus possible to employ two or more component synthetic resins having a particularly short potlife and curving time. Finally, the quality of the surface of the body is noticeably improved.

5. DESCRIPTION OF THE DRAWING

The above and other objects, features and advantages of the present invention will become more readily apparent from the following description, reference being made to the accompanying drawing in which:

FIG. 1 is a flow diagram illustrating a device for carrying out the present method in a simplified version;

FIG. 2 is a view similar to FIG. 1 of an arrangement employing two devices for the selective addition of reactive starting materials;

FIG. 3 is a view similar to FIG. 2 in which features of the latter device are combined with those of the device of FIG. 1;

FIG. 4A is a fragmentary diagrammatic cross-section of a portion of a mold after the first stage of a process according to the present invention;

FIG. 4B is a view of the portion of the mold of FIG. 4A after the second stage;

FIG. 5A is a fragmentary sectional view, partly in diagrammatic form, illustrating a mold cavity prior to charging with the initial mass of synthetic-resin material;

FIG. 5B is a section showing the next stage in the process; and

FIG. 5C is a similar view illustrating the final stage in the process.

6. SPECIFIC DESCRIPTION AND EXAMPLES

Referring first to FIGS. 4A and 4B of the drawing, which illustrate principles of the present invention, it may be assumed that the mold cavity C defined by a separable or multipart mold M has been charged with a body of foamable synthetic resin F which, upon expansion, completely fills the mold cavity C and consists of a reactive two-component resin system, the last portions of which are driven into the cavity C by a plunger P of the mixing chamber V communicating with the mold cavity. After the synthetic-resin body F has set or cured to a rupture-resistant but plastically deformable foam, a second resin layer R is introduced under pressure into the mold and forces the body F inwardly as represented by the arrows A. In other words the formed body F of foamed synthetic resin is in part displaced within a mold cavity C of invariable dimensions from the time that the synthetic-resin body F is enclosed. This is not to say that the mold M cannot be opened or closed during the formation of the body F or or to accommodate a body F formed elsewhere, or to permit the body F to be made from a plurality of materials. Once, however, the body F is enclosed in the mold cavity C, it is preferably fully confined therein so that at least some displacement of the previously formed body by the freshly introduced resin R is ensured. Where the body F does not fill completely the mold cavity C, the volume $V_r$ of the subsequently introduced resin must exceed the unoccupied volume $V_o$ of the mold. The pressure generated against the previously formed body F will then be a function of the moldclosing or retention pressure and the pressure of the subsequently introduced resin. At this pressure, a bond is formed at the interface I between the resin layers F and I and the outer surface S of the finished body may be of higher quality than would be the case if this surface was formed by the low-density material F directly. Various modifications of this basic system will be described below in connection with the apparatus.

From FIGS. 5A–5C, however, another aspect of the invention may be ascertained. In this embodiment, the mold M' has cavity C' which has been lined with a reinforcing material W in the form of a mesh, fabric, corrugated or perforated sheet, etc. of some flexibility. When the foamable synthetic resin F is introduced in a liquid state (FIG. 5B) it penetrates the reinforcing layer W and upon foaming embeds this layer in the rupture-resistant but plastically deformable body thus produced. In the next stage, a synthetic-resin layer R', of higher density is introduced all around the foamed body F' and compresses this body and its reinforcing layer inwardly (FIG. 5C). Here again the mold volume is constant and the resin R' at least partially compresses the previously introduced foamed mass.

In FIG. 1 of the drawing, we have shown a mold 1 which preferably is of the two-part separable type and defines a mold cavity 7 whose volume and configuration is that of the finished body. Such two-part molds have been used heretofore for the production of foamed synthetic-resin articles and the means for opening and closing the mold and for clamping the mold halves together against the hydrostatic pressure developed within the mold may be of any conventional type. The means for feeding foamed resin to the mold may likewise be of conventional construction although, with two component reactive synthetic resins, such as polyurethane foams, we prefer to make use of two supply lines of the type shown in FIG. 1. The latter Figure thus is intended particularly for polyurethane resins of varying hardness, rigidity or stiffness. The container 2, 3, each may receive one of the principal reactive components of the resin, e.g. a diisocyanate and a polyether, respectively, the activators, accelerators, expanding agents, blowing agents, etc. being mixed with one or another of the components. To that extent one or each of the receiptacles 2, 3 may form a mixing vessel.

The containers 2 and 3 are connected by respective conduits 4 and 5 to a common mixing head 6, electric pumps 8 being provided in each of the conduits for metering the appropriate quantity of the respective liquid component to the mixing head. The mixing head 6 may be of the type described in German Gebrauchsmuster No. 7 006 182 but preferably comprises a chamber opening into the mold cavity and receiving a control slide which may have passages for circulating the respective liquids back to the containers 2 and 3 in a closed position of the plunger. In this position, the latter has an end face lying flush with the mold wall and thus defining in part the mold cavity. The plunger may also be designed as a piston adapted to drive out any residue of the mixture from the mixing chamber. The mixture introduced into the mold cavity is thus homogeneous.

The blowing or expanding agent for the synthetic resin foams of the present invention may be of any conventional type although it is preferred to provide low-boiling organic liquids which vaporize within the mold cavity. The same vessels 2, 3 may be used for the second layer (R or R' as described with respect to FIGS. 4A, 4B and 5A–5C), provided that the residual expanding agent is permitted to evaporate from the container in which it was introduced. Of course, the second layer may have a reduced content of an expanding agent, in which case the second layer will have less of a cellular structure than the first body. The second filling of the mold is preferably in mass and volume at most equal to that of the first charge and generally is much less than that of the first charge. In other words the mass and/or volume of any subsequently introduced synthetic-resin charge is usually less than that of the formed foam core or first charge. The metering pumps 8 permit proportions of the two components of the mixture to be varied within wide ranges and allow the mixture to set with greater of lesser rigidity as desired. In some cases, it may be advantageous to introduce the second filling in greater mass or volume than the first, although this is not preferred.

Prior to introducing the second filling into the mold cavity 7 of mold 1, the cross-linking and foaming of the first filling being permitted to proceed to the point that the mold cavity is completely filled or substantially completely filled with a foamed body having sufficient rupture strength to prevent penetration but at least in part plastically deformable. The second filling thus is introduced under pressure so that it at least partly compresses the previously formed mass within the mold cavity under the pressure developed by the pumps 8 and by the piston or plunger of the mixing chamber. The pressure is developed against the counterpressure of the previously formed synthetic-resin body and the mold closing apparatus. At the interface, a physical and chemical bonding is therefore provided. The material introduced subsequently into the mold can be a simple surface layer or may be localized to provide a massive reinforcement of a particular region. In either case the finished body, when it is removed from the mold, has the configurations and dimensions of the mold cavity.

It is possible to use the apparatus of FIG. 1 in a modified manner when, for example, the formed body of the first filling of the mold cavity 7, not only completely occupies the latter but is completely cross-linked and foamed before the second charge is introduced. In this case, the first charge should set to a soft-elastic condition in the completely cured state. When the second charge is introduced, the synthetic-resin mass previously formed in the mold cavity is compressed resiliently so that the pressure at the interface is a function of the restoring force generated by this body. At this pressure, the two resin layers or materials will nevertheless bond together, especially if the resins are of the same general type.

According to another aspect of the invention, the foam body may be introduced into the mold cavity after being produced elsewhere. For example the body may be a foam block inserted into the mold and having a different configuration from the latter but resiliently compressed when the second synthetic resin mass is introduced. Of course, the body may have the same configuration as the mold cavity and can be coextensive therewith. It may also be desirable to make the body somewhat larger than the mold cavity although of geometrically similar configuration, whereupon the body is compacted when the mold is closed. The second synthetic resin then is injected into the mold cavity against the pressure of the precompressed body.

We have also found it to be advantageous, as described generally in connection with FIGS. 5A–5C, to inntroduce into the mold cavity a compressible cellular fiber body, for example of corrugated paper, papier-maché, cellulose, fleece or perforated paper material and to embed these reinforcing substances and those previously named in the first of subsequent synthetic-resin masses. For example, the reinforcing or filling material may be present in the mold as the first or foamable synthetic resin is injected and can be embedded therein. The second and any subsequent layers may then surround the reinforced or filled first body. Alternatively or in addition the mold may be opened after preparation of the first body to introduce a reinforcing layer or filling layer around the previously formed foam body or deformable shape, whereupon the second or other synthetic-resin layer is introduced to surround the foam shape and penetrate the newly applied layer. Other layers (e.g. third, fourth) can also be applied in the same manner. Where fillers of the type are surrounded by the synthetic-resin material, they form a particular, effective and inexpensive core surrounded by the resin. The insert may be compressed by the resin in place of the first foam body.

The mold cavity 7 preferably has the volume and configuration of the finished body to be produced therein and the volume and configuration of a foam shape which is formed therein initially and is in part compressed by the injection of additional synthetic-resin material. However, to accommodate the foam shape, the mold cavity may be varied. The second and any subsequent introduced synthetic-resin mass advantageously possess physical and/or chemical properties different from those of the foam shape disposed in the mold when the subsequent synthetic resin injections are carried out. For example, where a simple additional resin mass is introduced, it may be of a microporous foam whereas the core or previous foam shape is composed of a macroporous or macrocellular foam. The outer layer may also be of a nonfoaming material or may be of a foam similar to the previously produced shape but of a different color. When three or more synthetic-resin materials are used, the foam may be a relatively low-density material having poor strength characteristics and the subsequently applied layers may include a high-density foam and a foamless synthetic resin respectively.

In FIG. 2, we have shown a system in which a two-part mold 11 has a mold cavity 17. Containers 12 and 13 are provided for the reactive components of a settable synthetic-resin mass and are connected by ducts 14 and 15, provided with electrically driven metering pumps 18, to the mixing head 16 communicating with the mold cavity 17 from below. The system of FIG. 2 is provided also with a mixing head 19 parallel to the mixing head 16 and opening into the mold cavity 17 from above, i.e. on the opposite side of the mold cavity from mixing head 16. The mixing heads 16 and 19 are of the type described in the aforementioned copending application.

The mixing heads 16 and 19 are connected to the lines 14 and 15 via valves 24 and 25 which feed the respective conduits 20, 21 and 22, 23. The valves may be electrically, hydraulically or pneumatically controlled and the operation of the valves may be automated and timed with respect to the mold opening and closing procedure as will be apparent below.

Where the mold cavity has a complex geometric configuration, more than one mixing head 16 or mixing head 19 may be provided on each of the opposite sides of the mold. The charges introduced into the mold in succession can be of the same composition or of different proportions of the two reactive components and may have more or less expanding agent.

The mode of operation of the system of FIG. 2, with examples of the appropriate time period of each phase, is given below.

Phase 1: The foaming mold of FIG. 2 is empty, valves 24 and 25 are closed and the mold 11 is clamped in its closed condition. The time origin is this starting phase.

Phase 2: The valves 24 are opened and pumps 18 operated at the appropriate proportionate speeds to feed the reactive components of the first charge to the mixing head 19 of mold 11. The mixture is injected into the mold cavity 17 at the pressure developed by pumps 18. The valves 24 are closed and pumps 18 cut off (duration and total elapsed time 10 seconds).

Phase 3: The first mass of synthetic resin expands, cross-links and sets to a plastic compressible but rupture-resistant state, filling the mold cavity with the resulting foam (duration = 110 seconds, total elapsed time = 120 seconds).

Phase 4: The valves are open and the pump started (with adjustment of the reactive-component ratio) to inject the second synthetic-resin mass into the mold cavity and displace the previously formed body (duration = 5 seconds, total elapsed time = 125 seconds).

Phase 5: Valve 24 is closed and the valves 25 opened. The pumps 18 are actuated to introduce a third charge into the mold. The second and third charges thus sandwich a core of the first charge between them. The pumps and valves are then closed, (duration = 5 seconds, total elapsed time = 130 seconds).

Phase 6: The mold contents are permitted to harden completely (duration = 360 second, total elapsed time = 490 seconds).

Phase 7: The mold is open, the product removed and the mold again closed and locked (duration = 30 seconds, total elapesed time = 520 seconds).

The aforedescribed sequence can be modified and the duration shortened by reducing the number of charges introduced into the mold, by simultaneously introducing the second and third charges and by allowing the product to cure completely elsewhere after it has initially set within the mold cavity. Of course the various times will depend also upon the reactivity and character of the components.

Where sandwich structures are desired, the metering pumps may be set to provide synthetic-resin materials of the same basic type for all three layers, but different with respect to porosity, density and hardness. Some examples follow:

A. The first charge is a polyurethane resin soft foam of low-density and low compressive strength, the second and third charges applied to opposite sides of the first charge, are composed of polyurethane foam with higher density and greater hardness.

B. The core body is formed from the first charge of polyurethane hard foam of low-density but high sound and heat-insulating quality and relatively high rigidity. The second charge is of a polyurethane integral hard foam with higher density and improved structural characteristics while the third charge is an unfoamed polyurethane duromer with high mechanical strength properties and good surface texture.

C. The system is the same as in B except that the second and third charges are interchanged to alter the inner and outer surface textures and character.

D. The core layer consists of a polyurethane hard foam, the second and third layer consist of the polyurethane duromer unfoamed.

The boiling point of the expanding agent employed is dependent largely upon the hydrostatic pressure generated during the chemical reaction within the mold and in the mixing chamber. The initial charge is introduced into the mold while the latter is substantially empty and thus expansion occurs with little back pressure. The material can be introduced with low pressure into the mold. The second charge, however, must be introduced at a pressure of up to 10 atmospheres gauge into the mold and expansion of it must take place against the pressure within the mold. As a consequence, a reduced degree of foaming results even where the second charge has a composition identical to that of the first charge. By varying the pressures at which the components are introduced into the mold cavity, it is possible to vary the degree of expansion without difficulty and otherwise modify the properties of the finished product.

In FIG. 3 we have shown a third embodiment of the present invention which corresponds substantially to FIGS. 1 and 2 with respect to much of the subject matter already described. In this embodiment, the mold 31 is of the separable type and, in its closed condition, defines a mold cavity 37. The system also comprises two receptacles 32 and 33 for the reactive liquid component of the synthetic resin mixture which is to be injected into the mold. Conduits 34 and 35 lead from each of these receptacles and are provided with metering pumps 38. The valve systems 44 and 45 connect the conduits 34 and 35 with two mixing heads 36 and 39, respectively, opening into the mold cavity 37 on opposite side thereof. Each of the mixing heads may be constructed as previously described, with a hydraulic displaceable plunger adapted to drive out any residue of the reaction mixture and to form part of the wall of the mold cavity. Lines 42 and 43 connect the valve system 44 with mixing head 36 while similar lines 40 and 41 connect the valve system 45 with a mixing head 39.

Spaced from the mixing head 36, but on the same side of the mold cavity as the latter (i.e. opening upwardly into the mold cavity 37) is a further mixing head 56 of the same construction. The mixing head 36 is connected to a supply and metering system as described in connection with FIG. 1. For the main liquid components, therefore, there are provided receptacles 52 and 53 which are connected by lines 54 and 55 with a mixing head 56. Each of the lines has a respective electrically operated metering pump 58. In place of the mixing head 56, the mold cavity 37 may communicate with any conventional synthetic resin injector adapted to charge the mold with foamable or nonfoamable synthetic resin, e.g. an injection-molding machine whose output can be appropriately metered.

With the apparatus illustrated in FIG. 3, it is possible to produce composite bodies from chemically different synthetic resins and to provide one of the synthetic resin materials as a filler while the other forms an outer layer to use the second layer as the filler while the first constitutes the outer layer or to form regions of each material on a given synthetic resin body.

When shaped structures are to be produced first or a foamed layer is to be provided we may make use of any foamable synthetic resin or elastomer or even nonelastomeric bodies which, however, must have some degree of compressibility of an elastic or plastic nature. These materials include substantially all materials capable of forming a cellular structures and preferably are the elastically compressible synthetic resins and elastomers of the polyurethane. The compressible body may also be formed of elastomers such as rubber, in bodies with homogeneous cross section and even such hard or brittle bodies which, however, have a plastically deformable or elastically deformable state at the moment at which the second synthetic resin material is introduced. The second material may be elastically compressible or of the hard and/or brittle type but preferably is characterized by high surface quality, limited flexibility and yieldability and high toughness. The polyurethane hard foams, duromers and the like are especially satisfactory for this purpose.

The following sequence is preferably used in operating the apparatus shown in FIG. 3.

PHASE I

All metering pumps 58, 38 are cutoff, the valves of groups 44 and 55 are closed and the mold 31 is clamped, the mold cavity 37 being opened. This phase is considered the origin from which elapsed time is measured.

PHASE II

The feed system 52 through 56, or another source of synthetic resin, is operated to charge the mold cavity with a first synthetic resin mass adapted to set to form the filler body or shape. The pumps 58 are reflective while pumps 38 are off and the valves 44 and 45 are closed (duration = 10 sec., total elapsed time = 10 sec.).

PHASE III

The foamed body is permitted to expand and cure until it reaches a plastically compressible and rupture-resistant state (duration = 110 sec., total elapsed time = 120 sec.).

PHASE IV

The dosing and feed system 32 through 36, 38 and 42 through 44 is rendered effective, the pumps 38 turned on, the valves 44 are opened and a second synthetic resin reaction mixture is injected via the head 36 into the mold cavity below the body previously formed, partly compressing it (duration = 5 sec., total elapsed time = 125 sec.).

PHASE V

The feed system 32 through 36, 38, 42 through 44 is then cut off, the valves 44 closed and the metering pump 38 de-energized. The valves 45 are then opened and pumps 38 turned on again to introduce a third charge of the reaction mixture into the mold cavity via mixing head 39 from the top, the third charge being equal to or different from the volume or mass of the second charge. The previously formed body is partly compressed by the addition of this synthetic resin material (duration about 5 sec., total elapsed time = 130 sec.).

PHASE VI

The system feeding via the mixing head 39 is then cut off at valve closed. The contents of the mold cavity are permitted to set, crosslink and fully harden so that the body is removable (duration = 360 sec., total elapsed time = 490 sec.).

PHASE VII

The mold 31 is opened, the hardened object removed and the mold again closed for repeat of the sequence (duration = 30 sec., total elapsed time = 520 sec.).

The system of FIG. 3 admits of varied modifications along the line previously discussed. For example, additional reaction vessels may be provided for each of the mixing head so that different reactive mixture can be introduced through each or any of the mixing heads. The mass, volume, composition of the mixtures may be varied using the metering pumps or other means, and any desired additive may be supplied with any of the components provided that the same are compatible therewith. The valve units 44 and 45 may be eliminated where a single reactive mixture is to be supplied simultaneously on opposite sides of the formed synthetic resin body within the mold, etc. The substitution of polyether in one of the mixtures for a polyester, for example, requires only that an additional vessel and metering pump be provided.

The system has been found to be particularly effective for polyurethane combinations of the following type:

A. Polyurethane resin soft foam as first charge, polyurethane semihard foam, polyurethane elastomer, polyurethane hard foam or duromer as the second charge and one of a similar group of polyurethanes for the third charge.

B. first charge in the system of FIG. 3 is a polyurethane integral semirigid foam while the second and third charges are the same or different polyurethane elastomers, polyurethane rigid foams (duromer), polyurethane duromer, unfoamed or anionically polymerized polyamide.

C. The first charge is a polyurethane rigid foam or polyurethane integral rigid foam (duromer) while the second and third charges are the same as those of the combination B above.

D. The first charge is a thermoplastic foam and the second and third charges are the same as those in combination B. It should be apparent that the system admits of many permutations the combinations of the various types of polyurethane resins. Where the materials are capable of being injected in the manner described and the foamed products have at least limited compressibility other synthetic resins may be used. For example, reactive mixtures of polyurethane, polyethylene, polypropylene and various polyesters may be employed as can systems leading to these products by polycondensation, polyaddition or copolymerization. The starting materials must, however, be in a liquid not completely rigid state so that they are able to set in the mold. The system may be used for the polyester coating of polystyrene foams to prevent moisture penetration, for the coating of phenolic resin foams. The coating materials can be epoxy resins in the form of mixtures of epoxy compound and an amine hardner, nylon and like polyamides, polybutenes, poly-4-methyl-pentene-1, polymers and copolymers of vinyl chloride, methyl methacrylates and linear polymers such as polyethyleneterephthalate.

By way of example a refrigerator housing is prepared using the system of FIG. 3 by injecting a polyurethane mixture of a polyol having a viscosity of 800 to 5,000 cp and an isocyanate with a viscosity of 100 to 300 cp, together with the usual additives, hardeners, etc. and a foaming agent into the mold cavity at a pressure of 100 kp/cm$^2$. The reaction takes place at room temperature to yield a foamed shape with a density of 30 to 150 kg/m$^3$. The mass is introduced via the system 52 through 56, 58. Following the time scheme set for the above in connection with FIG. 3, a second layer of synthetic resin duromer using the same polyol and isocyanate but without an expanding medium so that the viscosity of the polyol is 2000 cp, a hard-coating is applied. A similar coating is deposited on each side of the foam with a wall thickness of 0.5 to 5 mm. The resulting sandwich has high rigidity and excellent thermoinsulating qualities.

As another example of the invention, we can improve the surface quality of a thermoplastic foam by using the system of FIG. 1 to apply thereto a film having a thickness of 0.5 mm to 3 mm, at a pressure of 2 to 5 kp/cm$^2$ of polyurethane as described in the previous example.

The time sequence given in connection with FIG. 1 is followed.

We claim:

1. A method of making a composite foamed body comprising the steps of:
    introducing a flexible perforated reinforcing structure into a fixed volume mold cavity;
    injecting an expandable polyurethane resin reactive mixture into said cavity and permitting said resin reactive mixture to expand to fill said cavity, embed said structure therein and form a reinforced foamed element;
    injecting into said mold cavity a liquid mass of a settable polyurethane resin at a pressure sufficient to enable said mass to displace said element, subsequent to expansion of said expandable resin while the latter is in a compressible but rupture-resistant state without enlargement of said mold cavity; and
    hardening said mass to bond the hardened material of said mass to said element.

2. The method defined in claim 1 wherein a respective mass of the settable polyurethane resin is injected into said cavity on opposite sides of said element.

3. The method defined in claim 1 wherein said settable polyurethane resin has a volume and mass of at most that of said expandable reactive mixture.

* * * * *